(12) United States Patent
Neufeld et al.

(10) Patent No.: US 10,858,192 B2
(45) Date of Patent: Dec. 8, 2020

(54) CONVEYING DEVICE AND LINEAR TRANSPORT SYSTEM

(71) Applicant: Beckhoff Automation GmbH, Verl (DE)

(72) Inventors: Jörg Neufeld, Paderborn (DE); Andreas Sinzenich, Steinhagen (DE); Thomas Vorbohle, Rietberg (DE)

(73) Assignee: Beckhoff Automation GmbH, Verl (DE)

( * ) Notice: Subject to any disclaimer, the term of this patent is extended or adjusted under 35 U.S.C. 154(b) by 0 days.

(21) Appl. No.: 16/658,939

(22) Filed: Oct. 21, 2019

(65) Prior Publication Data

US 2020/0048006 A1    Feb. 13, 2020

Related U.S. Application Data

(63) Continuation of application No. PCT/EP2018/056360, filed on Mar. 14, 2018.

(30) Foreign Application Priority Data

Apr. 21, 2017    (DE) .......................... 10 2017 108 558

(51) Int. Cl.
| | |
|---|---|
| *B65G 17/32* | (2006.01) |
| *B65G 35/06* | (2006.01) |
| *B65G 39/09* | (2006.01) |
| *B65G 54/02* | (2006.01) |

(52) U.S. Cl.
CPC ............. *B65G 17/32* (2013.01); *B65G 35/06* (2013.01); *B65G 39/09* (2013.01); *B65G 54/02* (2013.01)

(58) Field of Classification Search
CPC ........ B65G 54/02; B65G 35/06; B65G 23/23; B65G 9/002; B65G 17/20; B65G 17/32; B65G 39/09; H02K 7/08; H02K 41/031; B60B 33/00; F16C 29/005; F16C 33/72; F16C 13/006
See application file for complete search history.

(56) References Cited

U.S. PATENT DOCUMENTS

| | | | |
|---|---|---|---|
| 4,113,328 A | 9/1978 | Meulen | |
| 4,867,579 A | 9/1989 | Gallone | |
| 5,632,589 A | 5/1997 | Bray et al. | |
| 9,008,831 B1 * | 4/2015 | Jacobs | B65G 47/52 700/217 |

(Continued)

FOREIGN PATENT DOCUMENTS

| | | |
|---|---|---|
| DE | 102012103378 A1 | 10/2013 |
| DE | 102012204919 A1 | 10/2013 |

(Continued)

*Primary Examiner* — Mark A Deuble

(57) ABSTRACT

A conveying device for a linear transport system, wherein the conveying device comprises at least one rolling unit and a carrier unit, wherein the carrier unit is of U-shaped configuration and has an outer side and an inner side, wherein the inner side bounds a receiving space for receiving a running rail of the linear transport system, wherein the rolling unit is arranged in the receiving space in a manner spaced apart from the inner side, wherein the inner side and/or the outer side are/is substantially free from undercuts and/or corners and/or bumps, and/or wherein the inner side and/or the outer side are/is of substantially smooth configuration.

18 Claims, 9 Drawing Sheets

(56) References Cited

U.S. PATENT DOCUMENTS

| | | |
|---|---|---|
| 9,446,902 B2 | 9/2016 | Aumann et al. |
| 2003/0230941 A1 | 12/2003 | Jacobs |
| 2014/0331888 A1* | 11/2014 | Wernersbach ........ B60L 13/006 104/282 |
| 2016/0031648 A1* | 2/2016 | Prussmeier ............ B65G 54/02 104/107 |
| 2016/0176658 A1* | 6/2016 | Aumann ................ B65G 54/02 198/803.11 |
| 2016/0176659 A1* | 6/2016 | Aumann ................ B65G 54/02 198/619 |
| 2016/0229645 A1 | 8/2016 | Von Ehrenstein et al. |

FOREIGN PATENT DOCUMENTS

| | | |
|---|---|---|
| DE | 102013216958 A1 | 2/2015 |
| DE | 102014100636 A1 | 7/2015 |
| DE | 102014110714 A1 | 2/2016 |
| DE | 102014117150 A1 | 5/2016 |
| EP | 0557995 A1 | 9/1993 |
| EP | 0982839 A2 | 3/2000 |
| EP | 1672772 A2 | 6/2006 |
| EP | 2390992 A2 | 11/2011 |
| EP | 2560904 A1 | 2/2013 |
| EP | 2843814 A2 | 3/2015 |
| FR | 1389193 A | 2/1965 |

\* cited by examiner

CONVEYING DEVICE AND LINEAR TRANSPORT SYSTEM

CROSS REFERENCE TO RELATED APPLICATIONS

This patent application claims the priority of the International Patent Application No. PCT/EP2018/056360 filed 14 Mar. 2018, and German Patent Application No. DE10,2017/108,558.0, filed 21 Apr. 2017, entitled FÖRDEREINRICHTUNG UND LINEARTRANSPORTSYSTEM, each of which is incorporated by reference in the entirety and for all purposes.

FIELD

The invention relates to a conveying device and a linear transport system.

BACKGROUND

EP2 560 904 B1 discloses a transporting apparatus for conveying a product, wherein the transporting apparatus comprises a multiplicity of conveying elements which are movable independently of one another and are intended for conveying products, a positionally fixed running rail which is arranged in an encircling manner and defines a running path with at least one running track for the conveying element, and a linear motor drive apparatus for driving the conveying elements, wherein each conveying element has permanent magnets which are operatively connected to coils of the linear drive apparatus, and wherein each conveying element has at least one first partial element and one second partial element which are connected in an articulated manner to each other by joints. Each conveying element has a modular construction and the individual partial elements have an identical basic construction. The transporting device has numerous undercuts and gaps and is therefore complicated to clean.

Thus, for example, when the transporting apparatus is used in the production of food or in the packaging of food, food particles can be deposited together with germs in the gaps and undercuts. The food particles serve here as a breeding ground for germs. If not all of the food particles are removed during the cleaning of the transporting device, the transporting device can transmit the germs during the production of the food to the further food to be produced and can infect the latter with the germs.

BRIEF SUMMARY

The present invention provides an improved conveying device and an improved linear transport system.

Examples

According to one aspect, a conveying device comprises at least one rolling unit and a carrier unit. The carrier unit is of U-shaped configuration and on the outside has an outer side and on the inside has an inner side, wherein the inner side bounds a receiving space for receiving a running rail of the linear transport system, wherein the rolling unit is arranged in the receiving space in a manner spaced apart from the inner side, wherein the inner side and/or the outer side are/is substantially free from undercuts and/or corners and/or bumps, and/or wherein the inner side and/or the outer side are/is of substantially smooth configuration.

According to one further aspect, a conveying device for a linear transport system comprises at least one rolling unit, a magnet arrangement and a carrier unit. The carrier unit is of U-shaped configuration. The carrier unit has a receptacle, wherein the magnet arrangement is arranged in the receptacle. The receptacle is closed on a side facing a drive module of the linear transport system by a further closure element, wherein the further closure element covers the magnet arrangement.

According to one further aspect, a linear transport system comprises at least one drive module, a running rail and a conveying device. The conveying device comprises at least one rolling unit, a magnet arrangement, a bearing arrangement and a carrier unit, wherein the bearing arrangement supports the rolling unit on the carrier unit so as to be rotatable about an axis of rotation, wherein the bearing arrangement is arranged in the bearing space. The rolling unit has a rolling body comprising a running surface, a closure element and a bearing space, wherein the closure element is connected on the end side to the rolling body and seals the bearing space on the end side in relation to an environment. The running rail has at least one rail running surface, wherein the running surface of the rolling body rests on the rail running surface of the running rail so that the running rail guides the conveying device in a movement. The carrier unit engages around the running rail and the drive module at least in sections. The drive module has a control unit and a stator having a multiplicity of windings, wherein the control unit is connected to the windings and is configured to activate the windings in such a manner that the stator switchably provides a moving magnetic field, wherein the moving field is operatively connected to the magnet arrangement and the moving field moves the conveying device along the running rail.

This avoids the situation where aggressive cleaning media which are used for freeing the conveying device from dirt, and optionally for disinfecting the conveying device, penetrate the carrier unit. The improved cleaning options reliably remove deposition possibilities for particles, in particular food particles, which may serve as a breeding ground for germs or fungi. Furthermore, this avoids transmission of germs to a product being transported and/or processed with the conveying device. Similarly, adhesion of particles to the conveying device is reduced or avoided, and therefore cleaning intervals for cleaning the conveying device are extended in comparison to known conveying devices.

The conveying device is thereby suitable for use in the food industry or the pharmaceutical industry since high hygiene certification standards can be particularly readily satisfied with the conveying device.

In a further embodiment, the carrier unit has a carrier with a first carrier portion and at least one second carrier portion, wherein the second carrier portion is arranged inclined with respect to the first carrier portion and is connected to the first carrier portion, wherein the inner side on the first carrier portion and on the second carrier portion is of flat configuration in sections, wherein the inner side between the first carrier portion and the second carrier portion is of curved configuration in such a manner that the inner side merges steplessly between the first carrier portion and the second carrier portion. Easier cleaning is additionally made possible as a result. Furthermore, an accumulation of particles is avoided—in particular in regions at bumps, corners or undercuts which are difficult to clean and on which germs or fungi may accumulate.

In a further embodiment, the carrier is of U-shaped and mirror-symmetrical configuration and has at least one third carrier portion and a fourth carrier portion, wherein the third carrier portion is arranged on a side of the second carrier portion facing away from the first carrier portion and is connected to the second carrier portion, wherein the third carrier portion is arranged inclined with respect to the first carrier portion and second carrier portion, wherein the fourth carrier portion is arranged on a side of the third carrier portion facing away from the second carrier portion and is connected to the third carrier portion. The fourth carrier portion is arranged inclined with respect to the third carrier portion, wherein the second carrier portion and the fourth carrier portion are arranged on a side of the third carrier portion facing the receiving space, wherein the fourth carrier portion bounds a receiving opening of the receiving space on a side facing away from the first carrier portion, wherein the inner side extends on the inside beyond the carrier portions and is of stepless configuration. The conveying device can thereby be fastened particularly readily to the running rail and at the same time has a compact construction which can be readily cleaned.

In a further embodiment, the conveying device comprises a bearing arrangement, wherein the bearing arrangement supports the rolling unit on the carrier unit so as to be rotatable about an axis of rotation, wherein the rolling unit comprises a rolling body, a closure element and a bearing space, wherein the rolling body has a running surface circumferentially and bounds the bearing space on the inside, wherein the bearing arrangement is arranged in the bearing space, wherein the running surface is configured to lie against a rail running surface of the running rail of the linear transport system and to guide the conveying device along the running rail, wherein the closure element is connected on the end side to the rolling body and seals the bearing space on the end side in relation to an environment.

In a further embodiment, the closure element is of dome-shaped configuration and completely covers the rolling body on the end side. It is thereby avoided, in particular during the cleaning of the conveying device, that lubricants emerge from the bearing arrangement and possibly contaminate the carrier unit.

In a further embodiment, the rolling body and the closure element are on the outside free from undercuts and/or corners and/or bumps and/or are of substantially smooth configuration.

In a further embodiment, the rolling unit has a first sealing element, wherein the first sealing element closes the bearing space on a side of the rolling body facing away from the closure element. The bearing space is thereby hermetically sealed in relation to an environment. This makes it possible to avoid even on this side the situation where media penetrate the bearing space, which media can firstly lead to contamination of the conveying device and secondly to damage to the bearing arrangement. Furthermore, the bearing arrangement can be of particularly cost-effective configuration. Furthermore, a buildup of germs in the bearing space is avoided.

In a further embodiment, the first sealing element has a first sealing surface radially on the inside, and a second sealing surface and a sealing outer surface radially on the outside, wherein the first sealing surface lies against a fastener which fastens the bearing arrangement to the carrier unit, wherein the second sealing surface lies against the rolling body on the inside, wherein the sealing outer surface is arranged on a side of the first sealing element facing away from the bearing space, wherein the sealing outer surface is configured in such a manner that a first transition between the fastener and the sealing outer surface and a second transition between an end surface of the rolling body, which end surface faces the first sealing element, and the sealing outer surface are substantially stepless, wherein the sealing outer surface is of substantially concave configuration with respect to the bearing space. It may be a particular advantage here if the first sealing element is of wider configuration on the first sealing surface in the axial direction with respect to the axis of rotation than on the second sealing surface.

In a further embodiment, the carrier unit comprises a second sealing element, wherein the second sealing element is arranged between the carrier and the fastener, wherein the second sealing element seals the carrier and the fastener in relation to the environment. This reliably avoids contamination on the inside of the carrier unit. Furthermore, this avoids a buildup of germs in a carrier interior of the carrier.

In a further embodiment, a gap is arranged between the rolling unit and the carrier unit, wherein the gap has a gap width in the axial direction with respect to the axis of rotation, wherein the gap width is selected in such a manner that a mechanical cleaning device, for example a brush or a cloth, for the mechanical cleaning of the gap can be introduced into the gap. The conveying device can thereby be mechanically cleaned in a particularly simple manner.

In a further embodiment, the gap comprises a radially on the inside arranged rounded portion, wherein the rounded portion is substantially bounded by the first sealing element and the second sealing element, wherein the rounded portion has a radius, wherein the radius is at least 4 mm, preferably at least 6 mm. By the large distance of the rolling unit from the carrier unit, the gap can be cleaned by a water jet without additional mechanical aid. In addition, the gap can also be cleaned mechanically.

In a further embodiment, the conveying device has a magnet arrangement, wherein the carrier unit has a receptacle, wherein the magnet arrangement is arranged in the receptacle. The receptacle is closed on a side facing a drive module of the linear transport system by a further closure element, wherein the further closure element covers the magnet arrangement.

In a further embodiment, the carrier unit has a holding element and a further sealing element, wherein the receptacle is arranged in the holding element, wherein the further sealing element is arranged between the holding element and the carrier. This reliably avoids corrosive media from penetrating the carrier unit between the holding element and the carrier, and therefore contamination on the inside of the carrier unit can be reliably avoided. Furthermore, a buildup of germs in the carrier interior of the carrier is avoided.

In a further embodiment, the conveying device has a tab, wherein the tab comprises a housing and a signal influencer, wherein the housing has a housing interior in which the signal influencer is arranged. The housing has a frame and at least one covering element. The frame bounds the housing interior in sections, wherein the covering element is arranged laterally on the frame and closes the housing interior.

In a further embodiment, the covering element is of thin-walled configuration, preferably in the manner of a film. The covering element preferably has a thickness within a range of 0.1 mm to 0.8 mm. The covering element is connected preferably in an integrally bonded manner to the frame, preferably is adhesively bonded thereto.

In a further embodiment, the frame and the holding element are formed integrally and from the same material.

In a further embodiment, the carrier and/or the fastener and/or the further closure element comprises at least one of the following first materials: stainless steel, in particular V4A steel, plastic, polyethylene, or polytetrafluoroethylene; wherein the rolling unit and/or the closure element comprise/comprises at least one of the following second materials: plastic, or polyketone; wherein the first and/or the second sealing element comprise/comprises at least one of the following third materials: plastic, polytetrafluoroethylene, or fluorinated rubber; wherein the covering element comprises at least one of the following fourth materials: plastic, polyester, nonmetal, or nonmagnetic material.

In a further embodiment, the linear transport system has a drive module, a running rail and a conveying device, wherein the conveying device is configured as described above. The running rail has at least one rail running surface. The running surface rests on the rail running surface and the running rail guides the conveying device in a movement. The carrier unit engages around the running rail and the drive module at least in section.

In a further embodiment, the drive module has a control unit and a stator having a multiplicity of windings, wherein the control unit is connected to the windings and is configured to activate the windings in such a manner that the stator switchably provides a moving magnetic field. The moving field is operatively connected to the magnet arrangement and the moving field moves the conveying device along the running rail.

BRIEF DESCRIPTION OF THE DRAWINGS

The invention is explained in greater detail below on the basis of preferred exemplary embodiments with reference to figures, in which.

DETAILED DESCRIPTION

Figure 1:
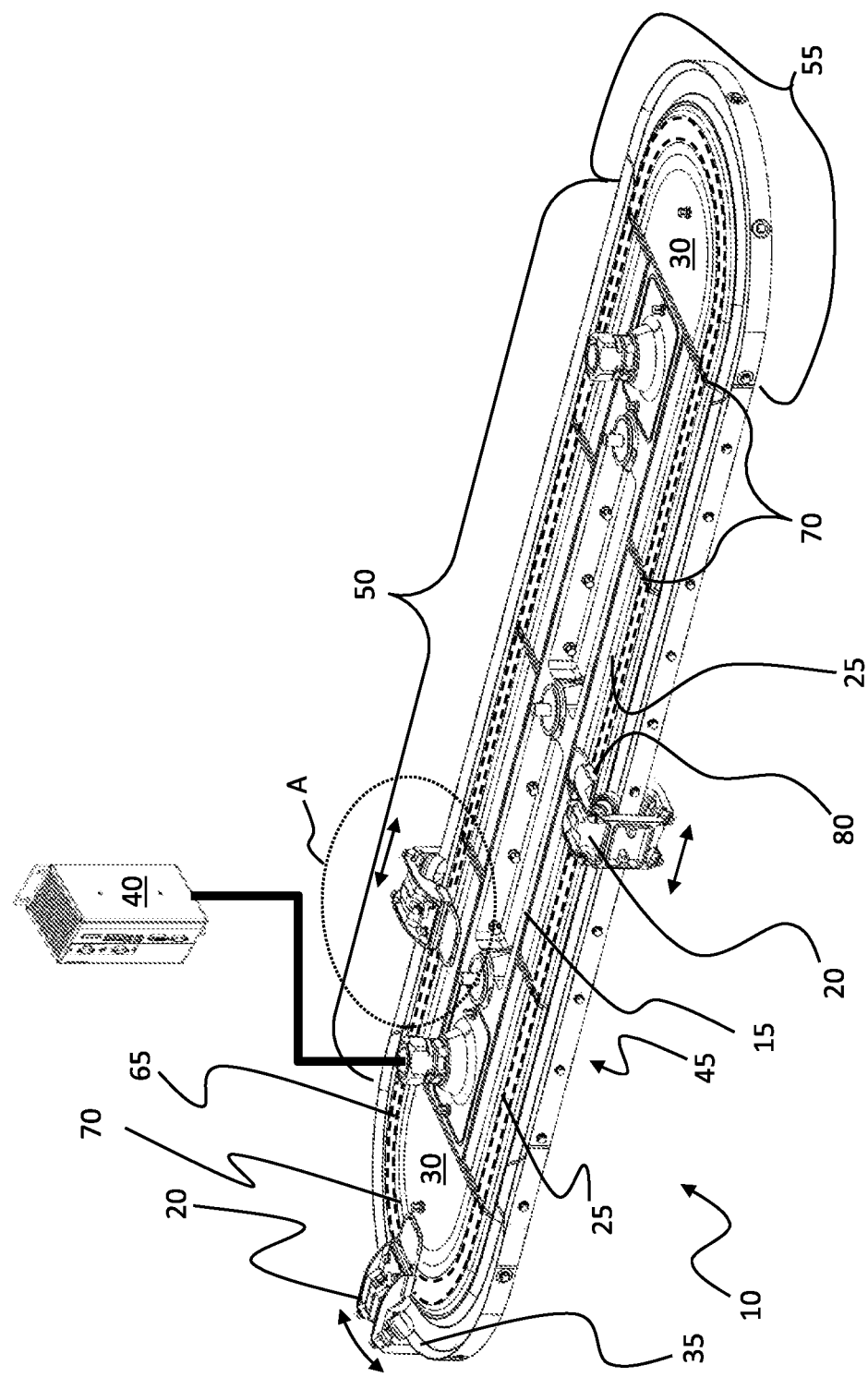
FIG. 1 shows a perspective illustration of a linear transport system.

FIG. 1 shows a perspective illustration of a linear transport system 10.

The linear transport system 10 has a plurality of identically configured conveying devices 20, at least one first drive module 25, optionally at least one second drive module 30 and a running rail 35. On the inside, the drive modules 25, 30 are connected to a machine bed 15. On the outside, the running rail 35 is arranged on the drive modules 25, 30 in an encircling manner. The conveying device 20 is fastened to the running rail 35 and partially engages around the drive module 25, 30.

The conveying device 20 is movable in relation to the running rail 35 and the drive module 25, 30. The conveying device 20 is guided in its movement by the running rail 35. Forces, inter alia also holding forces for transporting an object on the conveying device 20, are supported on the running rail 35 by the conveying device 20. The forces are supported on the machine bed 15 by the running rail 35 via the drive module 25, 30.

The linear transport system 10 furthermore has a control unit 40 and a drive device 45. The control unit 40 is connected to the drive modules 25, 30.

In the embodiment, the first drive module 25 and a first guide rail portion 50 arranged on the first drive module 25 extend in a longitudinal direction. A second guide rail portion 55 is of semicircular configuration, wherein the second drive module 30 is of semicircular configuration and arranged in a manner corresponding to the configuration of the second guide rail portion 55.

In the embodiment illustrated here, in each case four first drive modules 25 are arranged next to one another in a row per side, wherein the second drive module 30 is in each case arranged at a front and rear end of the row of the first drive modules 25. A closed, approximately ovally configured shape of the linear transport system 10 is thus produced. Of course, any desired other number of first drive modules 25 and/or differently shaped second drive modules 30, comprising in particular only an angular region of 22.5° or 45° or 90° or any other desired angular region, can also be combined to form a linear transport system 10. It is also not necessary here for said linear transport system 10 to form an encircling closed contour.

The drive device 45 is configured as a linear motor, wherein the drive device 45 has a stator 65 (illustrated by dashed lines) and a magnet arrangement 80 for each conveying device 20. The stator 65 is divided between the drive modules 25, 30, wherein each drive module 25, 30 has a stator unit 70.

The stator unit 70 comprises a multiplicity of coils which can be energized separately from one another. In the embodiment, a plurality of coils are arranged next to one another in the drive module 25, 30. The control unit 40 is electrically connected to the stator unit 70. Each drive module 25, 30 is connected to the running rail 35. The coils are arranged here in a row running parallel to the running rail 35.

The magnet arrangement 80 is arranged on the conveying device 20. The magnet arrangement 80 is in each case arranged to the side of the stator 65.

The control unit 40 is configured to vary a coil current through a predefined number of coils, i.e. a current flow through the predefined number of coils. The coil flow generates a moving magnetic field which interacts with the magnet arrangement 80.

The control unit 40 is configured to control the movement of the conveying device 20 along the running rail 35. The control unit 40 here controls or regulates the coil currents through the coils in such a manner that a force directed along or lengthwise along the drive module 25, 30 is exerted on the conveying device 20 via the interaction of the magnet arrangement 80 with the moving magnetic field generated by the coil currents. Each conveying device 20 can thereby carry out a different movement from the other conveying device 20, for example a different movement direction and/or acceleration and/or speed.

Figure 2:
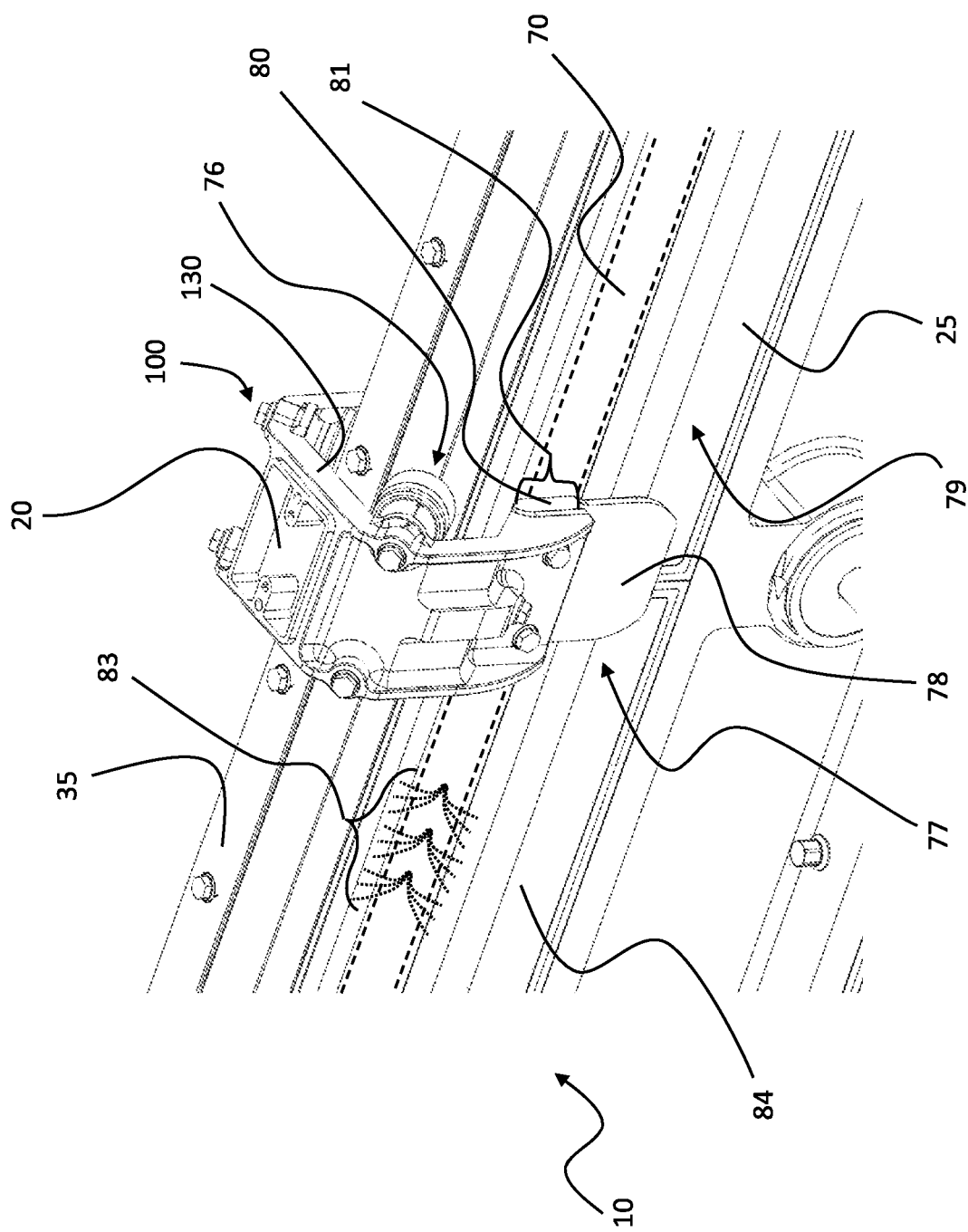
FIG. 2 shows a detail of the linear transport system shown in FIG. 1.

FIG. 2 shows the detail A of the linear transport system 10 shown in FIG. 1 in a position tilted in the direction of the observer.

The conveying device 20 has a carrier unit 100 with a carrier 130 and a guide arrangement 76. The carrier 75 is of U-shaped, preferably horseshoe-shaped, configuration and engages around both the running rail 35 and an outside portion of the first drive module 25. The guide arrangement 76 is connected to the carrier 75 and positions the conveying device 20 on the running rail 35.

In addition, the linear transport system 10 comprises a position detection device 77. The position detection device 77 comprises a tab 78 which is arranged at one end of the carrier unit 100, and a determination device (arranged concealed in the drive module 25 in FIG. 2). The tab 78 is of plate-like configuration. For example, the tab 78 is arranged spaced apart from an outer side 79 of the first drive module 25.

The magnet arrangement 80 is connected to the carrier unit 100. Adjacent to the tab 78, the magnet arrangement 80 comprises a first magnet arrangement portion 81. On the opposite side to the magnet arrangement portion 81 in a transverse direction which is oriented perpendicularly to the longitudinal direction, the magnet arrangement 80 comprises a second magnet arrangement portion which is concealed here by the running rail 35 and parts of the first drive module 25. Each magnet arrangement portion 81 can have one or more permanent magnets which are arranged, for example, in a row parallel to the running rail 35.

On activation, the stator unit 70, depending on the activation by the control unit 40, provides a moving field 83 (illustrated symbolically by magnetic field lines in FIG. 2). The moving field 83 forms a magnetic closure with the magnet arrangement 80. The control unit 40 can activate the stator unit 70 in such a manner that the moving field 83 is moved parallel to the running rail 35. By the coupling of the magnet arrangement 80 to the moving field 83, the conveying device 20 is carried along in the movement of the moving field 83.

The drive module 25, 30 comprises a housing 84. The stator unit 70 is arranged in the housing 84. The housing 84 has at least one of the following first materials: a material which is hygienic in terms of food technology, stainless steel, in particular a V4A steel, plastic, polyethylene, or polytetrafluoroethylene.

The housing 84 is substantially smooth on the outside. The outside of the housing 84 here has no undercuts, (sharp-edged) bumps, depressions or the like, and therefore adhesions of contaminants, for example food residues, can be particularly easily removed from the housing 84.

Figure 3:
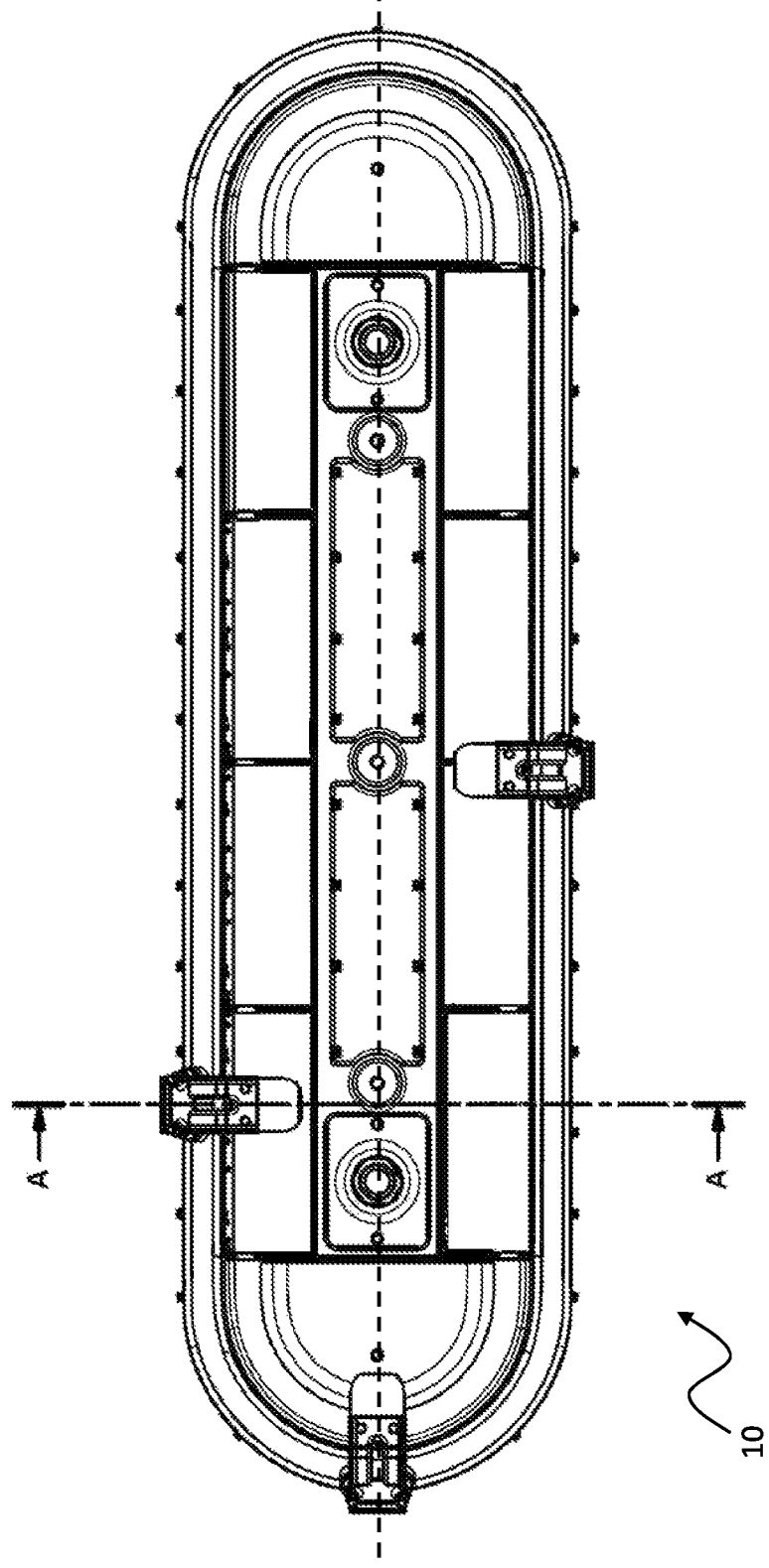
FIG. 3A shows a top view of the linear transport system illustrated in FIG. 1.
FIG. 3B shows a cross section along a section plane A-A shown in FIG. 3A through the linear transport system shown in FIG. 1.
Figure 3:
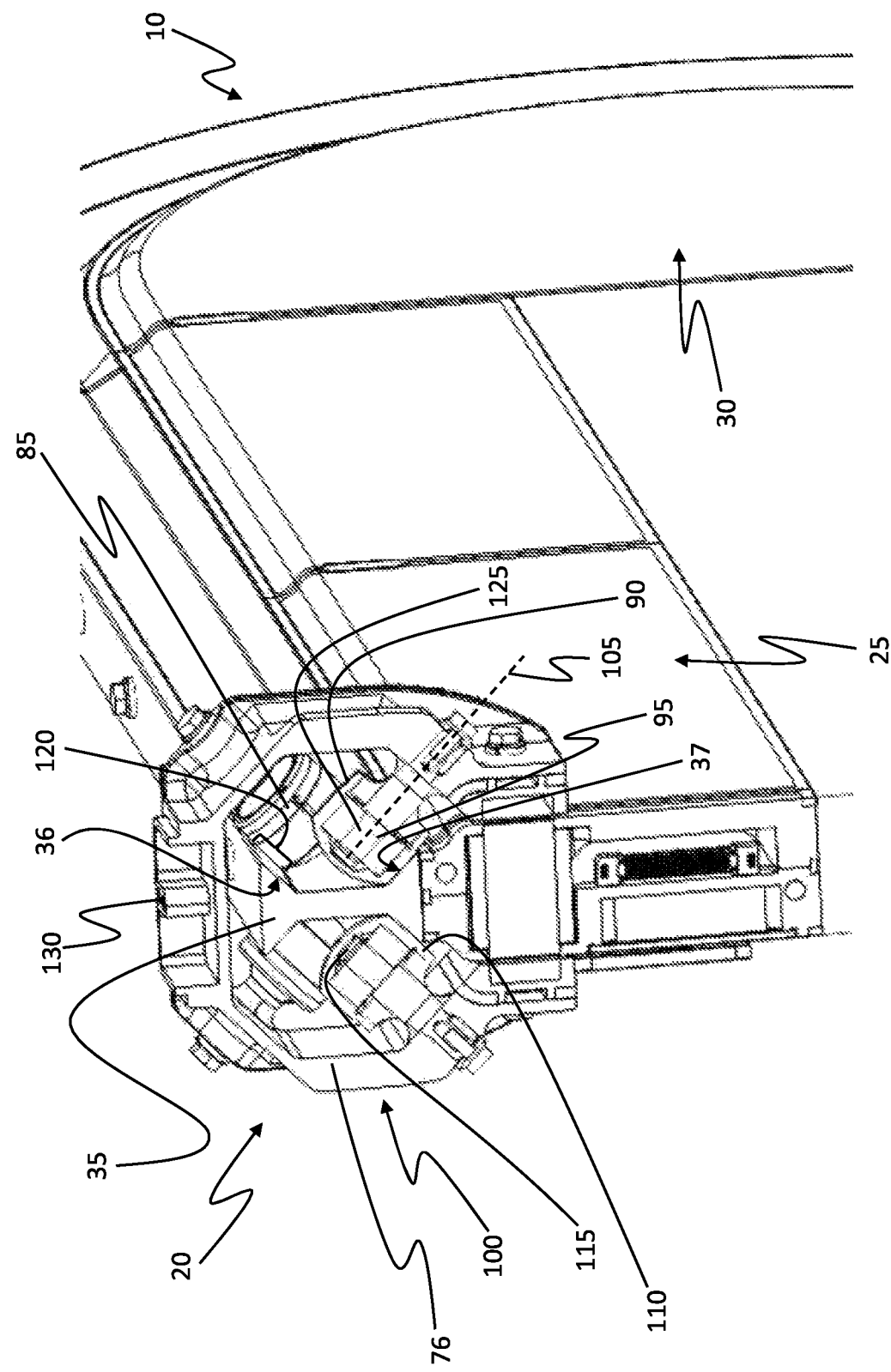

FIG. 3A shows a top view of the linear transport system 10 illustrated in FIG. 1.

FIG. 3B shows a cross section along a section plane A-A shown in FIG. 3A through the linear transport system 10 shown in FIG. 3A. For the sake of clarity, the section surfaces have not been provided with corresponding shading.

In the embodiment, the running rail 35 has four rail running surfaces 36, 37 which are arranged on both sides of the running rail 35. In the embodiment, the running rail 35 is of double T-like configuration, with the first and second rail running surface 36, 37 being arranged on respectively facing sides of a T portion of the running rail 35.

In the embodiment, the guide arrangement 76 has at least one first rolling unit 85, a second rolling unit 90 and at least one bearing arrangement 95 which is assigned in each case to the rolling unit 85, 90.

In the embodiment, the guide arrangement 76 has four first rolling units 85 and two second rolling units 90, wherein, owing to the sectioned illustration, only two of the first rolling units 85 and the two second rolling units are illustrated in a sectioned form. A different number of rolling units 85, 90 is also conceivable. In the embodiment, the rolling units 85, 90 are of identical configuration, but are arranged inclined in different directions. Each of the rolling units 85, 90 is mounted rotatably on the carrier unit 100 by the bearing arrangement 95 so as to be rotatable about an axis of rotation 105.

Each rolling unit 85, 90 has a rolling body 110 and a closure element 115. The rolling body 110 has a running surface 120 radially on the outside with respect to the axis of rotation 105. Radially on the inside, the rolling body 110 bounds a bearing space 125 in the circumferential direction. The bearing arrangement 95 is arranged in the bearing space 125. In the embodiment, the bearing arrangement 95 is configured as a rolling contact bearing. Of course, the bearing arrangement 95 may also be configured in another manner. The bearing arrangement 95 here defines both an axial position and the radial position of the rolling body 110.

In the embodiment, the running surface 120 of the first rolling unit 85 lies against the first rail running surface 36 and the running surface 120 of the second rolling unit 90 lies against the second rail running surface 37. Guiding of the conveying device 20 can be reliably ensured by the inclined arrangement of the first rolling unit 85 and of the first rail running surface 36 with respect to the second rolling unit 90 and the second rail running surface 37. In particular, torque support around the longitudinal direction of the conveying device 20 into the running rail 35 can also be ensured. The conveying device 20 can thereby reliably transport loads arranged, for example, on one side of the conveying device 20 and/or can ensure high cornering speeds, in particular in the region of the second drive module 30 and the second running rail portion 55. Short conveying times for conveying objects are thereby ensured.

Figure 4:
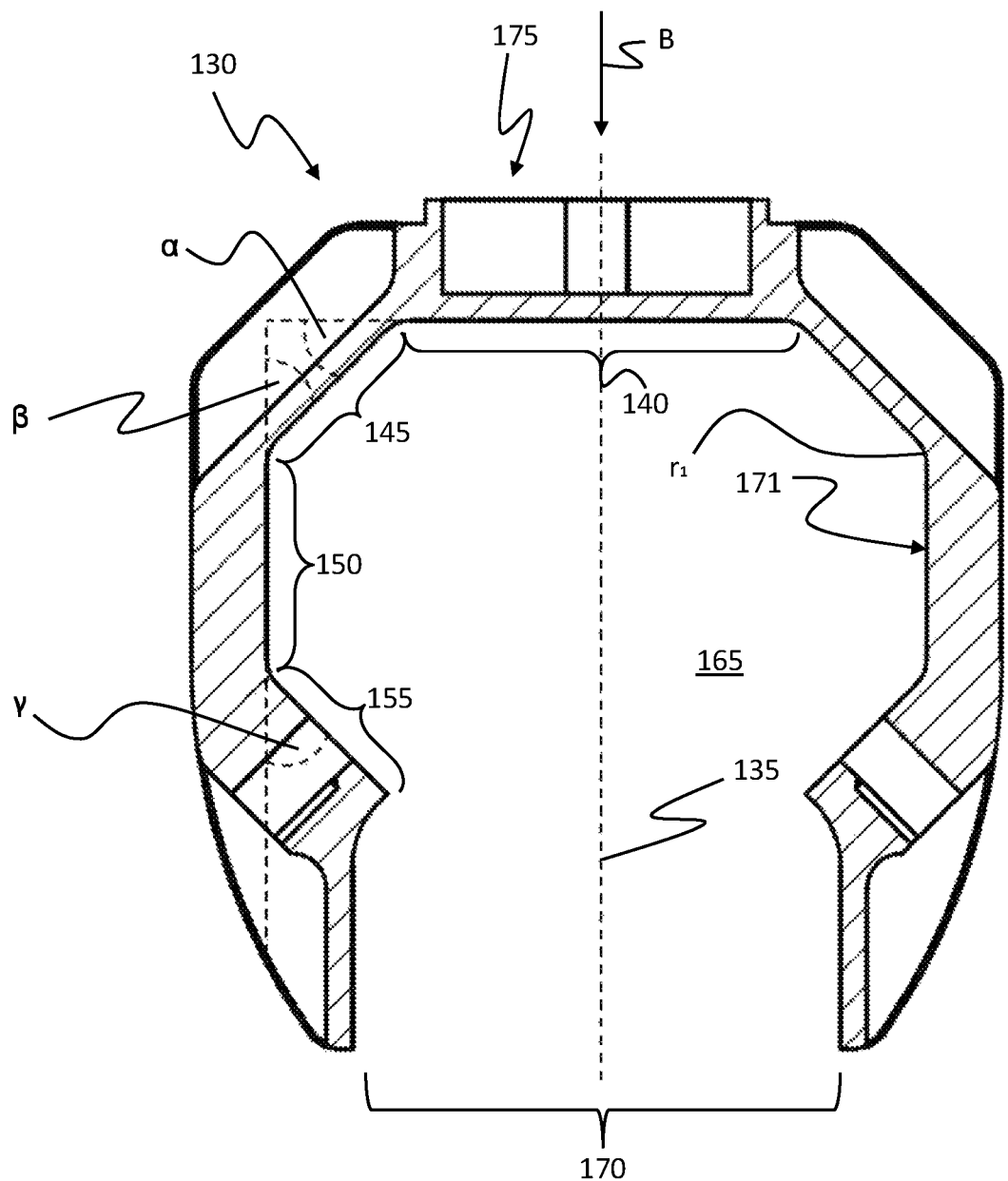
FIG. 4 shows a sectional view along the section plane A-A shown in FIG. 3A through a carrier of a conveying device of the linear transport system.

FIG. 4 shows an enlarged cross section through the carrier 130 of the conveying device 20.

In the embodiment, the carrier 130 is configured mirror-symmetrically with respect to a plane of symmetry 135, and therefore essentially only one of the two sides of the carrier 130 will be discussed below. The carrier 130 may also be of asymmetrical configuration.

The carrier 130 is of substantially horseshoe-shaped configuration, wherein the opening, referred to below as receiving opening 170, of the horseshoe points downward, as illustrated. Opposite the receiving opening 170, the carrier 130 has a first carrier portion 140. A second carrier portion 145, a third carrier portion 150 and a fourth carrier portion 155 are adjacent to said first carrier portion 140. The first carrier portion 140 is connected to the second carrier portion 145. On an opposite side to the first carrier portion 140, the second carrier portion 145 is connected to the third carrier portion 150. The third carrier portion 150 is connected to the fourth carrier portion 155 on a side facing away from the second carrier portion 145.

The first carrier portion 140 is arranged perpendicularly to the plane of symmetry 135. In the embodiment, the second carrier portion 145 is arranged inclined obliquely at a first angle $\alpha$ with respect to the first carrier portion 140. Preferably, the first angle $\alpha=45°$. The third carrier portion 150 for its part is arranged obliquely at a second angle $\theta$ with respect to the second carrier portion 145. Preferably, the second angle $\beta=45°$. As a result, the third carrier portion 150 is arranged perpendicularly to the first carrier portion 140.

The fourth carrier portion 155 is arranged inclined obliquely at a third angle $\square$ with respect to the third carrier portion 150 and extends inward in the direction of the plane of symmetry 135. The third angle $\square$ is 45°. The fourth carrier portion 155 is furthermore oriented perpendicularly to the second carrier portion 145. By the symmetrical configuration of the carrier 130 with respect to the plane of symmetry 135, the carrier 130 has a U-shaped, in particular a horseshoe-shaped configuration.

By the symmetrical configuration, the carrier 130 has a further second carrier portion 145, a further third carrier portion 150 and a further fourth carrier portion 155. The further carrier portions 145, 150, 155 are arranged mirror-symmetrically with respect to the plane of symmetry 135 in each case opposite the carrier portions 140, 145, 150, 155.

The carrier 130 together with the carrier portions 140, 145, 150, 155 bounds a receiving space 165 on an inner side 171. In the mounted state of the conveying device 20 on the drive module 25, 30, the running rail 35 and a portion of the drive module 25, 30 are arranged in the receiving space 165.

The inner side 171 is of smooth configuration. For example, the inner side 171 on the carrier portion 140, 145, 150, 155 is of a flat configuration in sections. At the transitions between the individual carrier portions 140, 145, 150, 155, the inner side 171 is in each case rounded with a first radius r1 in such a manner that the inner side 171 is of stepless configuration and is free from undercuts and/or edges and/or corners and/or bumps. The first radius r1 has a value which lies within a range of 4 mm to 30 mm, in particular within a range of 6 mm to 15 mm. On the outside, the carrier 130 has a connector 175 on the first carrier portion 140 in order to fasten further components of the conveying device 20 to the carrier 130. In the mounted state of the conveying device 10, the connector 175 is concealed by components fastened to the connector 175.

Figure 5:
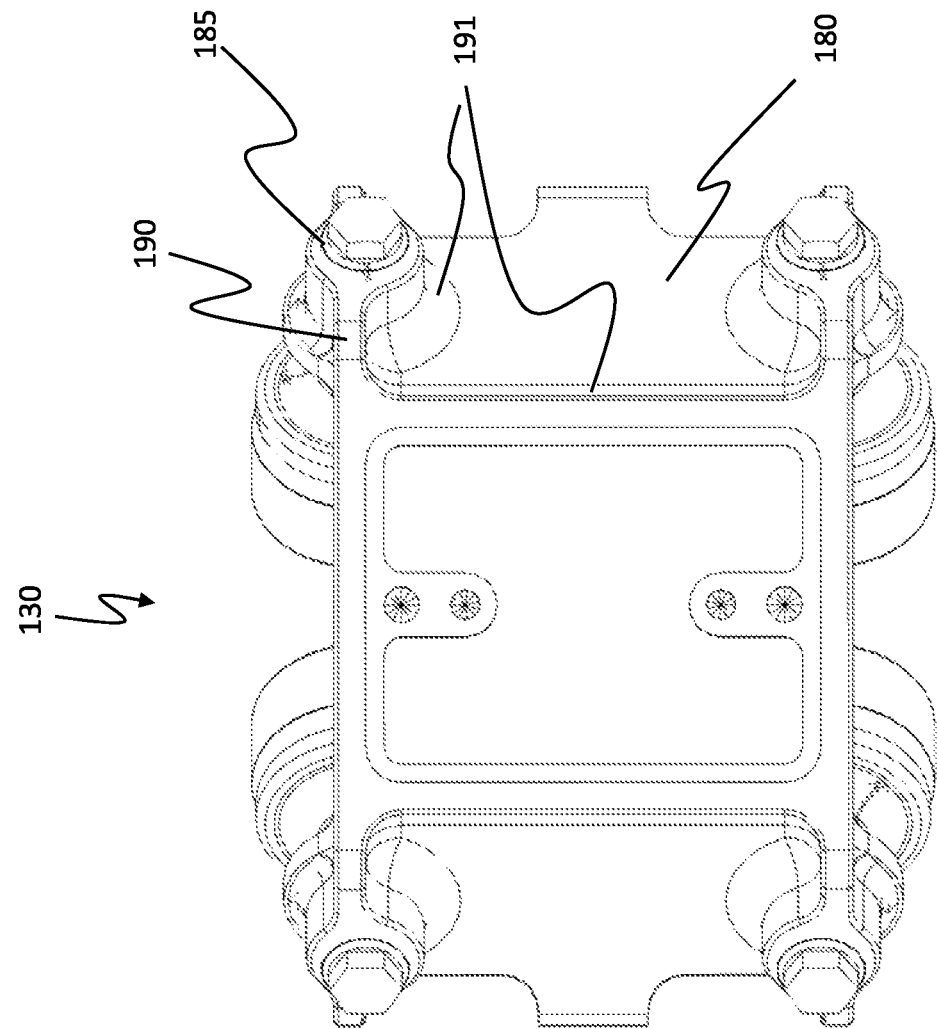
FIG. 5 shows a perspective illustration of the carrier shown in FIG. 4.

FIG. 5 shows a perspective top view of the carrier 130 in the direction B according to FIG. 4.

An outer side 180 of the carrier 130 is of smooth configuration like the inner side 171. Smooth is understood here as meaning that the inner side 171 and the outer side 180 each have a mean roughness value, wherein the mean roughness value lies within a range of 0.2 μm to 0.8 μm, in particular within a range of 0.4 μm to 0.8 μm. Furthermore, the outer side 180 is free from undercuts and/or edges and/or corners and/or bumps. The carrier 130 can thus be cleaned particularly easily. The carrier 130 is configured in a weight-optimized manner, for example. The outside 180 of the carrier 130 here has at least one bushing 185, configured as a construction element, and/or web 190. The bushing 185 and the web 190 protrude and have a transition region 191 at the fixed end.

The omission of undercuts, corners and edges can be achieved by the transition region 191 between individual construction elements being rounded in each case. Easy cleaning of the carrier 130, for example even in a dishwasher, is thereby made possible.

Figure 6:
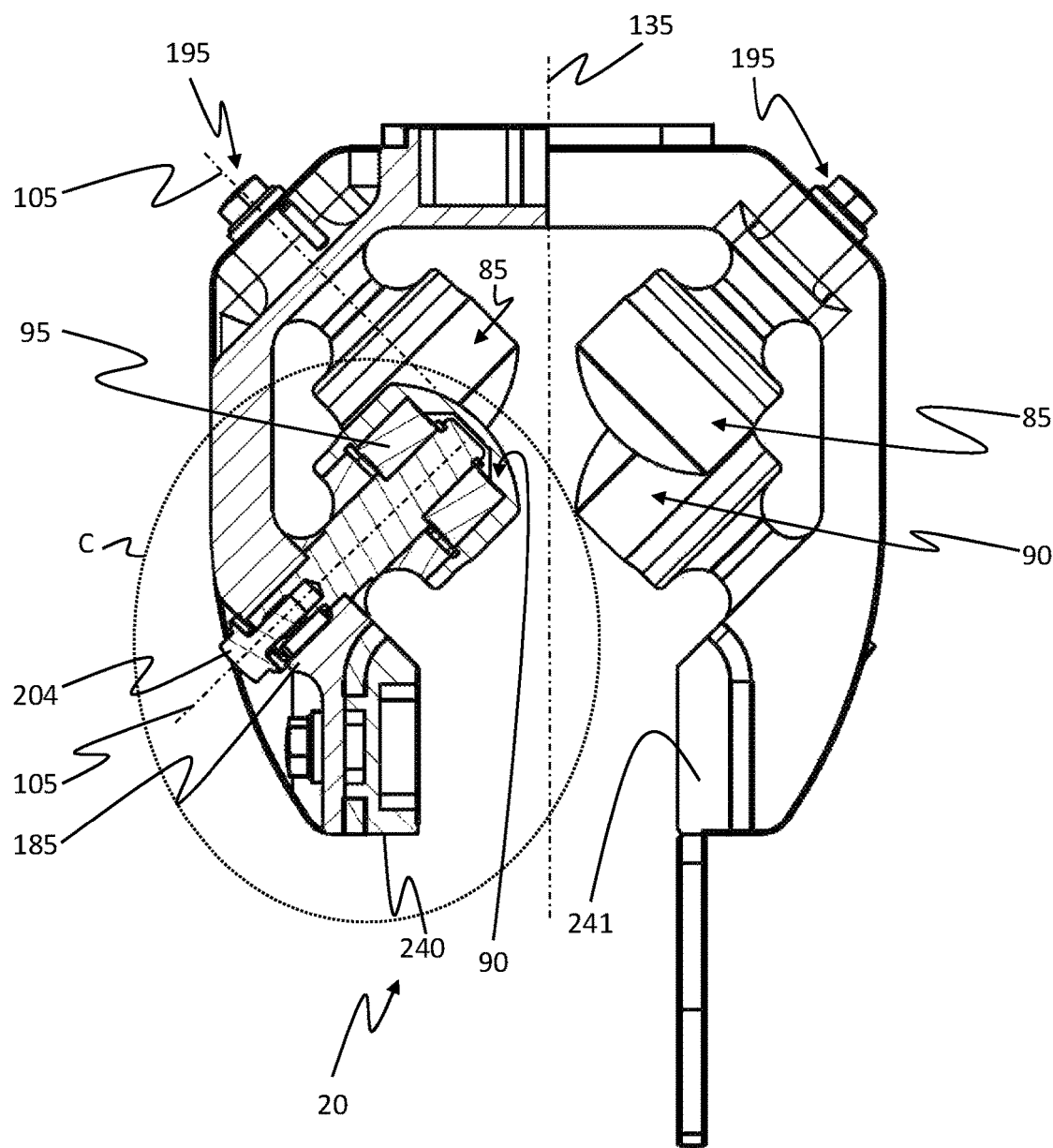
FIG. 6 shows a partial cross section along the section plane A-A shown in FIG. 3A through the conveying device.

FIG. 6 shows the carrier 130, which is illustrated in FIG. 4, in a partial cross section along the plane of symmetry 135 which forms the section plane. As can be seen, half of the carrier 130 is illustrated sectioned on the left of the plane of symmetry 135 and half not sectioned on the right of the plane of symmetry 135. Contrary to the illustration in FIG. 4, in this illustration the carrier 130 has yet further components which will be discussed in more detail below.

The first rolling unit 85 is arranged on the second carrier portion 145 (described in more detail with respect to FIG. 4) by a fastener 195. In the embodiment, a plurality of first rolling units 85 are arranged one behind another in the longitudinal direction. The arrangement of the first rolling unit 85 is mirror-symmetrical with respect to the plane of symmetry 135, and therefore a further first rolling unit 85 is in each case arranged opposite each first rolling unit 85 in the transverse direction and is fastened to the further second carrier portion 145 by a further fastener 195.

The second rolling unit 90 is fastened to the fourth carrier portion 155 (described in more detail with respect to FIG. 4) by a further fastener 195. The second rolling unit 90 is arranged in the longitudinal direction between in each case two first rolling units 85.

A further second rolling unit 90 is fastened opposite in the transverse direction and symmetrically with respect to the plane of symmetry 135 to the further fourth carrier portion 155 by a further fastener 195.

The fastener 195 is configured as a web bolt and comprises, for example, the first material. The fastener 195 is connected to the carrier portion 145, 155 by a connecting element 204, for example a screw, which reaches through the bushing 185.

In the region of a free end of the fastener 195, the bearing arrangement 95 is arranged on each fastener 195 in order to mount the rolling unit 85, 90 rotatably about the axis of rotation 105 and to connect same to the fastening element 195.

In the embodiment, the axis of rotation 105 about which the rolling unit 85, 90 is rotatable is arranged perpendicularly to the respectively associated carrier portion 145, 155. The axis of rotation 105 about which the first rolling unit 85 rotates is thereby oriented perpendicularly to the axis of rotation 105 about which the second rolling unit 90 is arranged rotatably.

A holding element 240, 241 of the carrier unit 100 is arranged on the fourth carrier portion 155 in each case opposite the latter. The holding element 240, 241 and the carrier comprise the first material. The first material of the carrier 130 and of the holding element 240, 241 may be advantageously identical.

Figure 7:
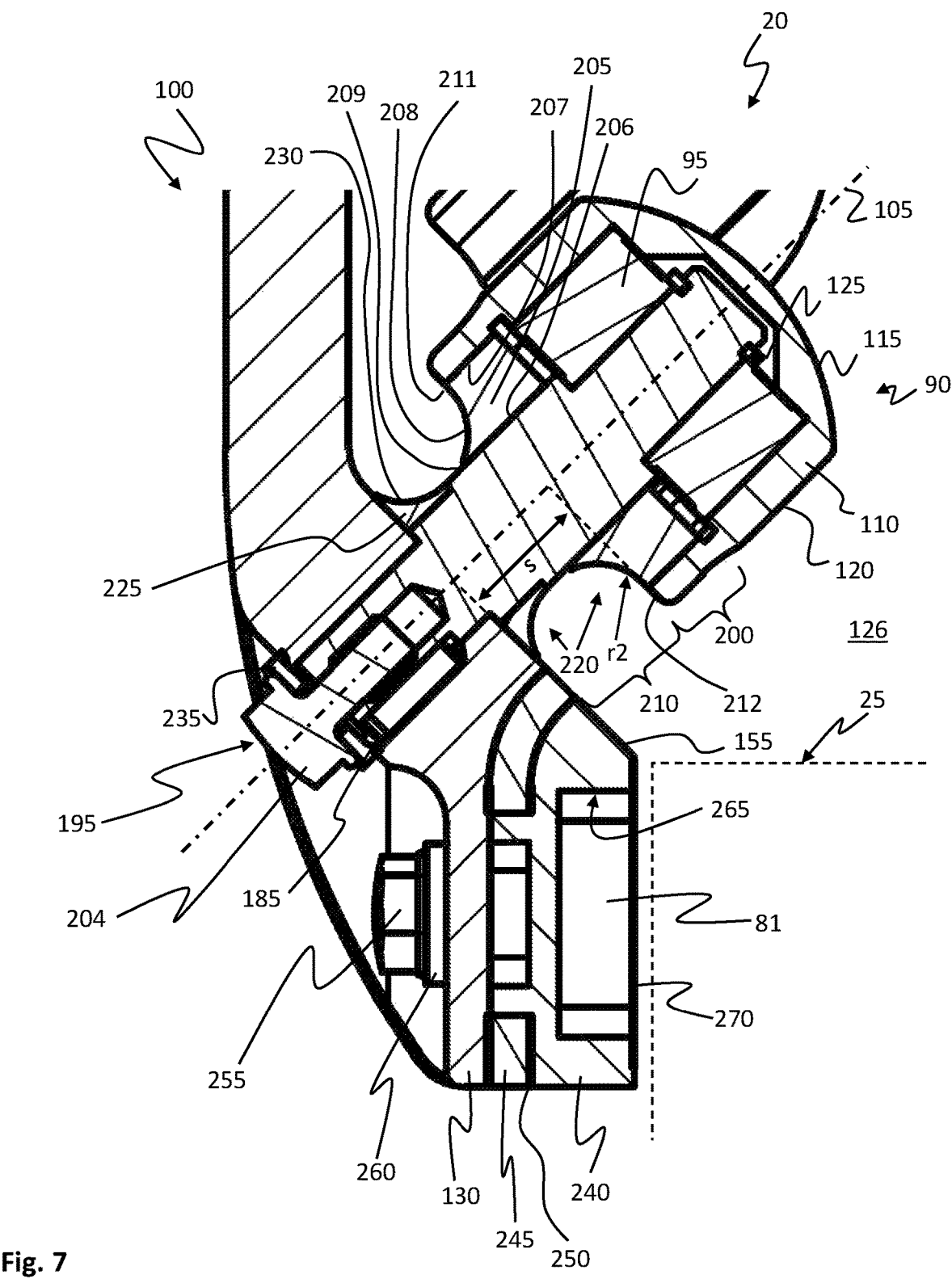
FIG. 7 shows a detail of the partial cross section shown in FIG. 5 of the conveying device.

FIG. 7 shows the detail C of the partial cross section shown in FIG. 6 through the conveying device 20.

The closure element 115 bounds the bearing space 125, in which the bearing arrangement 95 is arranged, on a side facing away from the fourth carrier portion 155. In the embodiment, the closure element 115 is of dome-shaped configuration and extends substantially completely on the end side over the rolling body 110. It may be a particular advantage here if the closure element 115 and the rolling body 110 are formed integrally and from the same material. It may be a particular advantage if, for example, the rolling body 110 and the closure element 115 comprise a plastic, in particular polyketone as a second material. As a result, the rolling body 110 and the closure element 115 can be produced particularly simply in an injection molding process.

On the outer side, the rolling body 110 and the closure element 115 are free of undercuts and/or corners and/or bumps and are of substantially flat configuration. They have a mean roughness value here, wherein the mean roughness value lies within a range of 0.2 μm to 0.8 μm, in particular within a range of 0.4 μm to 0.8 μm. Easy cleaning of the second rolling unit 90 on the outer side can thereby be ensured.

Adjoining the closure element 115, the running surface 120 extends in the axial direction. On a side facing away from the closure element 115, the rolling body can additionally have a press-in portion 200. The press-in portion 200 can be configured here as a constriction on the outer side of the rolling body 110.

On a side facing away from the closure element 115, the second rolling unit 90 has a first sealing element 205. The first sealing element 205 seals the bearing space 125 in relation to the environment 126. The first sealing element 205 preferably comprises at least one of the following third materials: plastic, or polytetrafluoroethylene.

A gap 210 is arranged between the second rolling unit 90 and the fourth carrier portion 155. The gap 210 has a gap contour which is formed in a defined manner by the predetermined components adjacent to the gap 210. The gap contour here has a rounded portion 220 radially on the inner side with respect to the axis of rotation 105. The rounded portion 220 is arranged here radially on the inner side of the gap 210. The rounded portion has a second radius r2. Radially on the outside, the gap 210 is of groove-like configuration and is open. By the rounded portion 220, the gap 210 tapers radially inward from radially on the outside.

The gap 210 has a (maximum) gap width s in the axial direction with respect to the axis of rotation 105 of the second rolling unit 90. The gap width s is selected in such a manner that the gap 210 can be cleaned particularly easily, for example with a water jet, in particular in a dishwasher. Furthermore, the wide configuration of the gap 210 prevents the accumulations of contaminants, for example such as greases and oils or dirt particles or food particles, in the gap 210. For example, the gap width 8 is up to 16 mm, in particular 12 mm.

The first sealing element 205 lies circumferentially against the fastener 195 radially on the inner side with a first sealing surface 206. Radially on the outer side, the first sealing element 205 has a second sealing surface 207. The second sealing surface 207 is oriented parallel to the first sealing surface 206 and runs in the axial direction with respect to the axis of rotation 105. The second sealing surface 207 lies radially on the inner side against the press-in portion 200. An axial position of the first sealing element 205 on the rolling body 110 is fixed by the press-in portion 200.

The first sealing element 205 is configured to be wider on the first sealing surface 206 in the axial direction with respect to the axis of rotation 105 then on the second sealing surface 207. Furthermore, the first sealing element 205 has a first sealing outer surface 208 which is arranged on a side facing away from the bearing space 125 and on a side facing the gap 210. The first sealing outer surface 208 is rounded concavely with respect to the bearing space 125 and bounds the rounded portion 220 on one side. The first sealing outer surface 208 is configured in such a manner that a first transition 209 between the fastener 195 and the first sealing element 205 is substantially smooth. The first sealing outer surface 208 and the first sealing surface 206 are substantially adjacent to each other at the first transition 209. Furthermore, the first sealing outer surface 208 is oriented tangentially with respect to a circumferential surface of the fastener 195 at the first transition 209.

A second transition 211 between the first sealing outer surface 208 of the first sealing element 205 and an end surface 212 of the rolling body 110 is likewise of substantially smooth configuration. This takes place by the first sealing outer surface 208 running substantially tangentially to the end surface 212 of the rolling body 110 at the second transition 211 at which the first sealing outer surface 208 is adjacent to the second sealing surface 207.

On a side of the gap 210 facing away from the second rolling unit 90, the gap 210 is bounded by a second sealing element 225 of the carrier unit 100 and the fourth carrier portion 155. The second sealing element 225 is arranged between the fastener 195 and the carrier 130. The second sealing element 225 has a second sealing outer surface 230. The second sealing outer surface 230 like the first sealing outer surface 208 is of rounded configuration and bounds the rounded portion 210. The rounding of the second sealing outer surface 230 is configured convexly with respect to the fourth carrier portion 155 and is formed in such a manner that, at transitions between the second sealing element 225 and the fastener 195 and the fourth carrier portion 155, said transitions are substantially stepless. The second sealing outer surface 230 is arranged opposite the first sealing outer surface 208 in the axial direction with respect to the axis of rotation 105.

The second sealing element 225 serves to avoid the situation where contaminants or liquids from the environment 126 penetrate between the fastener 195 and the carrier 130. This avoids unintentional soiling and/or corrosion within the carrier unit 100.

The carrier unit 100 has a third sealing element 235. The third sealing element 235 is configured as a sealing disk and is arranged between the carrier 130 and the connecting element 204. This avoids contaminants penetrating on the outer side into the carrier 130 in the region of the bushing 185.

The holding element 240 is fastened to the fourth carrier portion 155 by a further fastener 255 and is arranged adjacent to the receiving opening 170 illustrated in FIG. 4. The holding element 240 together with the fourth carrier portion 155 bounds a sealing groove 250 which is arranged between the fourth carrier portion 155 and the holding element 240 in an encircling manner around the holding element 240. A fourth sealing element 245 of the carrier unit 100 is arranged in the sealing groove 250.

A fifth sealing element 260 is also provided on the further fastener 255. The fourth and fifth sealing element 245, 260 prevent contaminants, in particular liquids, from penetrating between the further fastener 255 and the holding element 240 and the carrier 130. The first to fifth sealing elements 225, 235, 245, 260 preferably comprise at least one of the following third materials: plastic, fluorinated rubber, or polytetrafluoroethylene.

The holding element 240 has a receptacle 265. The receptacle 265 is arranged on a side facing away from the carrier 130 and on a side facing the receiving opening 170 illustrated in FIG. 4.

The receptacle 265 on a side facing the receiving opening 170 and on a side facing the drive module 25 is closed here by a further closure element 270. In the embodiment, the further closure element 270 is of thin-walled configuration, in the manner of a film. It may be a particular advantage here if the further closure element 270 has a thickness d, wherein the thickness d lies within a range of 0.1 mm to 0.8 mm. The second magnet arrangement portion 81 is arranged in the receptacle 265.

A material of the further closure element 270 is selected in such a manner that the moving field and the second magnet arrangement portion 81 can interact such that the drive of the conveying device 20 is reliably ensured. This can take place, for example, by the further closure element 270 comprising, for example, the first material. The first material here is nonmagnetic. The thin-walled configuration ensures here that the operative connection between the moving field and the magnet arrangement 80 is not interrupted or not disproportionally disturbed. Furthermore, electrochemical corrosion of the carrier 130 is avoided.

By an integrally bonded connection of the further closure element 270 to the holding element 240, secure fastening of the further closure element 270 to the holding element 240 is ensured.

The magnet arrangement 80 is thereby protected in relation to the environment 126 in such a manner that penetration of moisture in the second magnet arrangement portion 81 is avoided and therefore, for example, corrosion of the second magnet arrangement portion 81, in particular formation of rust on the second magnet arrangement portion 81, is avoided.

Figure 8:
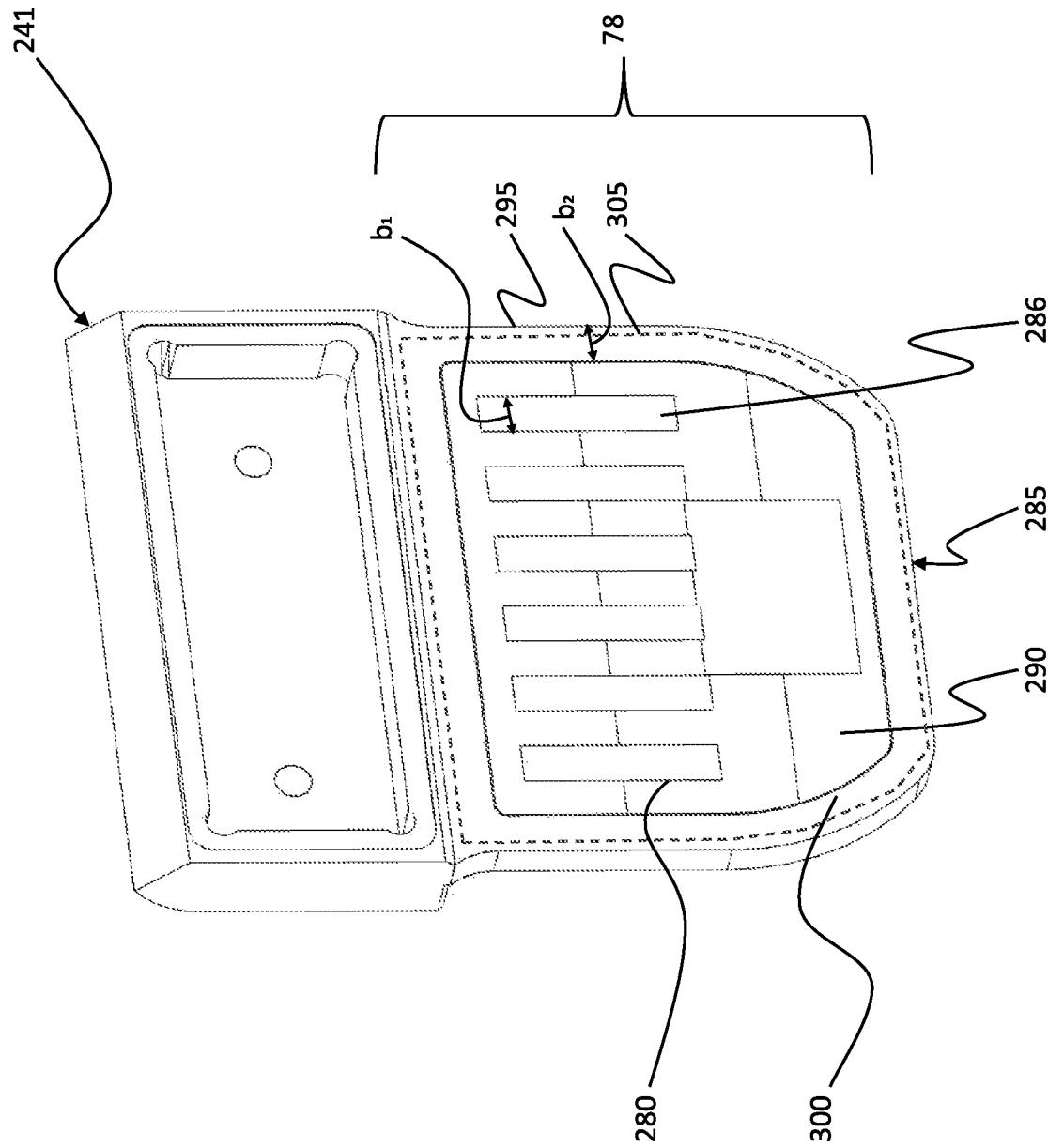
FIG. 8 shows a perspective illustration of a tab.

FIG. 8 shows a perspective illustration of the further holding element 241 illustrated in FIG. 6.

The tab 78 is fastened to the further holding element 241 and is formed therewith in particular integrally and from the same material.

The tab 78 has at least one signal influencer 280 and a housing 285. The signal influencer 280 can comprise, for example, a surface 286 on a printed circuit board. The surface 286 has a width b1 in the longitudinal direction of the running rail and is composed of a metallic material.

In the embodiment, the housing 285 has a frame 295. The frame 295 is of encircling configuration and is connected on the upper side to the further holding element 241. The frame 295 bounds a housing interior 290. The signal influencer 280 is inserted here into the frame 295 in a precisely fitting manner. The frame 295 has a frame width b2 in the longitudinal direction of the running rail level with the vapor-plated surface 286. The frame width b2 may be advantageously identical to the width b1 of the vapor-plated surface 286. The frame 295 in each case laterally has a supporting surface 300. A covering element 305 (illustrated symbolically by dashed lines in FIG. 8) rests on the supporting surface 300, wherein the covering element 305 closes the housing interior 290 in a fluid-tight manner.

The covering element 305 may preferably comprise at least one of the following fourth materials: plastic, polyester, nonmetal, or nonmagnetic material. It may be a particular advantage here if the covering element 305 is of thin-walled configuration, in particular in the manner of a film. Furthermore, it may be an advantage if the covering element 305 has a thickness dA within a range of 0.05 mm to 0.2 mm. The covering element 305 is connected in an integrally bonded manner to the frame 295 on the supporting surface 300. The covering element 305 may preferably have an adhesive layer with which the covering element 305 is adhesively bonded to the frame 295 at the supporting surface 300. The adhesive layer can extend over the housing interior 290, and therefore the signal influencer 280 is additionally fixed in the transverse direction with respect to the running rail by being adhesively bonded to the covering element 305.

In the embodiment, the covering element 305 is arranged on both sides of the frame 295 and closes the housing interior 290 in both directions. Of course, the housing 285 can also be configured to the effect that the housing—similarly to the holding element 240—is closed by a housing wall on a side facing away from the drive module.

The covering element 305 and the thin-walled configuration ensure that a signal of the determination device is influenced by the frame 295 level with the surface 286 and by the surface 286 in such a manner that, on the basis of the influenced signal, the determination device can reliably determine a position of the tab 78 relative to the drive module 25.

The above-described configuration of the conveying device 20, in particular of the linear transport system 10, ensures that narrow gaps or dead spaces or undercuts are avoided on the conveying device 20. By hermetically sealing the carrier 130 and the bearing arrangement 95, internal contamination of the conveying device 20, said contamination being particularly difficult to remove, is avoided.

The wide gap 210 between the carrier unit 100 and the rolling unit 85, 90 enable said gap to be cleaned particularly easily. Corrosion of the magnet arrangement 80 is avoided by the concealed arrangement of the magnet arrangement 80.

In addition, it may be an advantage if, for the respective use of the conveying device 20, the materials used are correspondingly resistant to the cleaning agents to be used and/or the contaminants which occur.

It is pointed out that the above-described configuration of the conveying device 20 is by way of example. In particular, it is conceivable for the rolling unit 85, 90 to be configured in some other way. In particular, a different number or a different orientation of the rolling units 95, 90 with respect to one another is conceivable. The running rail 35 can correspondingly also be configured in a manner corresponding to the different orientation of the rolling unit 85, 90.

This invention has been described with respect to exemplary embodiments. It is understood that changes can be made and equivalents can be substituted to adapt these disclosures to different materials and situations, while remaining with the scope of the invention. The invention is thus not limited to the particular examples that are disclosed, but encompasses all the embodiments that fall within the scope of the claims.

| TABLE OF REFERENCES | |
|---|---|
| 10 | Transport system |
| 15 | Machine bed |
| 20 | Conveying device |
| 25 | First drive module |
| 30 | Second drive module |
| 35 | Running rail |
| 36 | First rail running surface |
| 37 | Second rail running surface |
| 38 | Upper side of the running rail |
| 39 | Lower side of the running rail |
| 40 | Control unit |
| 45 | Drive device |
| 50 | First running rail portion |
| 55 | Second running rail portion |
| 60 | Center point |
| 65 | Stator |
| 70 | Stator unit |
| 76 | Guide arrangement |
| 77 | Position detection device |
| 78 | Tab |
| 79 | Outer side |
| 80 | Magnet arrangement |
| 81 | First magnet arrangement portion |
| 81 | Second magnet arrangement portion |
| 82 | Moving field |
| 83 | Housing |
| 85 | First rolling unit |
| 90 | Second rolling unit |
| 95 | Bearing arrangement |
| 100 | Carrier unit |
| 105 | Axis of rotation |
| 110 | Rolling body |
| 115 | Closure element |
| 120 | Running surface |
| 125 | Bearing space |
| 126 | Environment |
| 130 | Carrier |
| 135 | Plane of symmetry |
| 140 | First carrier portion |
| 145 | Second carrier portion |
| 150 | Third carrier portion |
| 155 | Fourth carrier portion |
| 160 | First carrier connecting portion |
| 161 | Second carrier connecting portion |
| 162 | Third carrier connecting portion |
| 165 | Receiving space |
| 170 | Receiving opening |
| 171 | Inner side |
| 175 | Connector |

-continued

TABLE OF REFERENCES

| 180 | Outer side |
| 185 | Bushing |
| 190 | Web |
| 191 | Transition region |
| 195 | Fastener/web bolt |
| 200 | Press-in surface |
| 204 | Connecting element |
| 205 | First sealing element |
| 206 | First sealing surface |
| 207 | Second sealing surface |
| 208 | First outer surface |
| 209 | First transition |
| 210 | Gap |
| 211 | Second transition |
| 212 | End surface of the rolling body |
| 220 | Rounded portion |
| 225 | Second sealing element |
| 230 | Second outer surface |
| 231 | Further plane of symmetry |
| 235 | Third sealing element |
| 240 | Holding element |
| 245 | Fourth sealing element |
| 250 | Sealing groove |
| 255 | Spacing portion |
| 255 | Further fastener |
| 260 | Fifth sealing element |
| 265 | Receptacle |
| 270 | Further closure element |
| 280 | Signal influencer |
| 285 | Housing |
| 286 | Surface |
| 290 | Housing interior |
| 295 | Frame |
| 300 | Supporting surface |
| 305 | Covering element |

What is claimed is:

1. A linear transport system comprising:
   at least one drive module,
   a running rail, and
   a conveying device,
   wherein the conveying device comprises at least one rolling unit, a magnet arrangement, a bearing arrangement and a carrier unit,
   wherein the bearing arrangement supports the rolling unit on the carrier unit so as to be rotatable about an axis of rotation,
   wherein the bearing arrangement is arranged in the bearing space,
   wherein the rolling unit has a rolling body comprising a running surface, a closure element and a bearing space,
   wherein the closure element is connected on the end side to the rolling body and seals the bearing space on the end side in relation to an environment,
   wherein the running rail has at least one rail running surface,
   wherein the running surface of the rolling body rests on the rail running surface of the running rail so that the running rail guides the conveying device in a movement,
   wherein the carrier unit engages around the running rail and the drive module at least in sections,
   wherein the drive module has a control unit and a stator having a multiplicity of windings,
   wherein the control unit is connected to the windings and is configured to activate the windings in such a manner that the stator switchably provides a moving magnetic field, and
   wherein the moving field is operatively connected to the magnet arrangement and the moving field moves the conveying device along the running rail.

2. The linear transport system as claimed in claim 1,
   wherein the carrier unit has a carrier with a first carrier portion and at least one second carrier portion,
   wherein the second carrier portion is arranged inclined with respect to the first carrier portion and is connected to the first carrier portion,
   wherein the inner side on the first carrier portion and on the second carrier portion is of flat configuration at least in sections, and
   wherein the inner side between the first carrier portion and the second carrier portion is of curved configuration in such a manner that the inner side merges steplessly between the first carrier portion and the second carrier portion.

3. A conveying device for a linear transport system,
   wherein the conveying device comprises at least one rolling unit and a carrier unit,
   wherein the carrier unit is of U-shaped configuration and has an outer side and an inner side,
   wherein the inner side bounds a receiving space for receiving a running rail of the linear transport system,
   wherein the rolling unit is arranged in the receiving space in a manner spaced apart from the inner side,
   wherein the inner side and/or the outer side are/is substantially free from undercuts and/or corners and/or bumps, and/or wherein the inner side and/or the outer side are/is of substantially smooth configuration,
   wherein the carrier unit has a carrier with a first carrier portion and at least one second carrier portion,
   wherein the second carrier portion is arranged inclined with respect to the first carrier portion and is connected to the first carrier portion,
   wherein the inner side on the first carrier portion and on the second carrier portion is of flat configuration at least in sections,
   wherein the inner side between the first carrier portion and the second carrier portion is of curved configuration in such a manner that the inner side merges steplessly between the first carrier portion and the second carrier portion,
   wherein the carrier is of U-shaped and mirror-symmetrical configuration and has at least one third carrier portion and a fourth carrier portion,
   wherein the third carrier portion is arranged on a side of the second carrier portion facing away from the first carrier portion and is connected to the second carrier portion,
   wherein the third carrier portion is arranged inclined with respect to the first carrier portion and second carrier portion,
   wherein the fourth carrier portion is arranged on a side of the third carrier portion facing away from the second carrier portion and is connected to the third carrier portion,
   wherein the fourth carrier portion is arranged inclined with respect to the third carrier portion,
   wherein the second carrier portion and the fourth carrier portion are arranged on a side of the third carrier portion facing the receiving space,
   wherein the fourth carrier portion bounds a receiving opening of the receiving space on a side facing away from the first carrier portion, and
   wherein the inner side extends on the inside beyond the carrier portions and is of stepless configuration.

4. A conveying device for a linear transport system,
wherein the conveying device comprises at least one rolling unit and a carrier unit,
wherein the carrier unit is of U-shaped configuration and has an outer side and an inner side,
wherein the inner side bounds a receiving space for receiving a running rail of the linear transport system,
wherein the rolling unit is arranged in the receiving space in a manner spaced apart from the inner side,
wherein the inner side and/or the outer side are/is substantially free from undercuts and/or corners and/or bumps, and/or wherein the inner side and/or the outer side are/is of substantially smooth configuration,
wherein the conveying device comprises a bearing arrangement,
wherein the bearing arrangement supports the rolling unit on the carrier unit so as to be rotatable about an axis of rotation,
wherein the rolling unit comprises a rolling body, a closure element and a bearing space,
wherein the rolling body has a running surface circumferentially and bounds the bearing space on the inside,
wherein the bearing arrangement is arranged in the bearing space,
wherein the running surface is configured to lie against a rail running surface of the running rail of the linear transport system and to guide the conveying device along the running rail, and
wherein the closure element is connected on the end side to the rolling body and seals the bearing space on the end side in relation to an environment.

5. The conveying device as claimed in claim 4, wherein the closure element is of dome-shaped configuration and completely covers the rolling body on the end side.

6. The conveying device as claimed in claim 4, wherein the closure element and the rolling body are formed integrally and from the same material.

7. The conveying device as claimed in claim 4, wherein the rolling body and the closure element are on the outside free from undercuts and/or corners and/or bumps and/or are of substantially smooth configuration.

8. The conveying device as claimed in claim 4,
wherein the rolling unit has a first sealing element, and
wherein the first sealing element closes the bearing space on a side of the rolling body facing away from the closure element.

9. The conveying device as claimed in claim 8,
wherein the first sealing element has a first sealing surface radially on the inside, and a second sealing surface and a sealing outer surface radially on the outside,
wherein the first sealing surface lies against a fastener which fastens the bearing arrangement to the carrier unit,
wherein the second sealing surface lies against the rolling body on the inside,
wherein the sealing outer surface is arranged on a side of the first sealing element facing away from the bearing space,
wherein the sealing outer surface is configured in such a manner that a first transition between the fastener and the sealing outer surface and a second transition between an end surface of the rolling body, which end surface faces the first sealing element, and the sealing outer surface are substantially stepless, and
wherein the sealing outer surface is of substantially concave configuration with respect to the bearing space,
wherein the first sealing element is of wider configuration on the first sealing surface in the axial direction with respect to the axis of rotation than on the second sealing surface.

10. The conveying device as claimed in claim 9,
wherein the carrier unit comprises a second sealing element,
wherein the second sealing element is arranged between the carrier and the fastener, and
wherein the second sealing element seals the carrier and the fastener in relation to the environment.

11. The conveying device as claimed claim 9,
wherein the carrier and/or the fastener element comprises at least one of the following first materials: stainless steel, V4A steel, plastic, polyethylene, or polytetrafluoroethylene;
wherein the rolling unit comprises at least one of the following second materials:
plastic, or polyketone; and
wherein the first sealing element comprises at least one of the following third materials:
plastic, polytetrafluoroethylene, or fluorinated rubber.

12. A conveying device for a linear transport system,
wherein the conveying device comprises at least one rolling unit and a carrier unit,
wherein the carrier unit is of U-shaped configuration and has an outer side and an inner side,
wherein the inner side bounds a receiving space for receiving a running rail of the linear transport system,
wherein the rolling unit is arranged in the receiving space in a manner spaced apart from the inner side, and
wherein the inner side and/or the outer side are/is substantially free from undercuts and/or corners and/or bumps, and/or wherein the inner side and/or the outer side are/is of substantially smooth configuration; and
wherein a gap is arranged between the rolling unit and the carrier unit,
wherein the gap has a gap width in the axial direction with respect to the axis of rotation, and
wherein the gap width is selected in such a manner that a mechanical cleaning device for the mechanical cleaning of the gap can be introduced into the gap.

13. The conveying device as claimed in claim 12,
wherein the gap comprises a radially on the inside arranged rounded portion,
wherein the carrier unit comprises a first sealing element and a second sealing element,
wherein the rounded portion is substantially bounded by the first sealing element and the second sealing element,
wherein the rounded portion has a radius, and
wherein the radius is at least 4 mm, or at least 6 mm.

14. The conveying device as claimed in claim 13,
wherein the conveying device comprises a bearing arrangement,
wherein the bearing arrangement supports the rolling unit on the carrier unit so as to be rotatable about an axis of rotation,
wherein the rolling unit comprises a rolling body, a closure element and a bearing space,
wherein the rolling body has a running surface circumferentially and bounds the bearing space on the inside,
wherein the bearing arrangement is arranged in the bearing space,
wherein the running surface is configured to lie against a rail running surface of the running rail of the linear transport system and to guide the conveying device along the running rail, and wherein the closure element is connected on the end side to the rolling body and seals the bearing space on the end side in relation to an environment; and wherein the first sealing element closes the bearing space on a side of the rolling body facing away from the closure element, wherein the second sealing element is arranged between the carrier and the fastener, and wherein the second sealing element seals the carrier and the fastener in relation to the environment.

15. A conveying device for a linear transport system, wherein the conveying device comprises at least one rolling unit and a carrier unit, wherein the carrier unit is of U-shaped configuration and has an outer side and an inner side, wherein the inner side bounds a receiving space for receiving a running rail of the linear transport system, wherein the rolling unit is arranged in the receiving space in a manner spaced apart from the inner side, wherein the inner side and/or the outer side are/is substantially free from undercuts and/or corners and/or bumps, and/or wherein the inner side and/or the outer side are/is of substantially smooth configuration, wherein the conveying device comprises a tab, wherein the tab comprises a housing and a signal influencer, wherein the housing has a housing interior in which the signal influencer is arranged, wherein the housing comprises a frame and at least one covering element, wherein the frame bounds the housing interior in sections, and wherein the covering element is arranged laterally on the frame and closes the housing interior.

16. The conveying device as claimed in claim 15, wherein the covering element is of thin-walled configuration, in the manner of a film, wherein the covering element has a thickness within a range of 0.1 mm to 0.8 mm, and wherein the covering element is connected in an integrally bonded manner to the frame, adhesively bonded thereto.

17. The conveying device as claimed in claim 15, wherein the frame and the holding element are formed integrally and from the same material.

18. A conveying device for a linear transport system comprising:

at least one rolling unit, a magnet arrangement and a carrier unit, wherein the carrier unit is of U-shaped configuration, wherein the carrier unit has a receptacle, wherein the magnet arrangement is arranged in the receptacle, wherein the receptacle is closed on a side facing a drive module of the linear transport system by a further closure element, wherein the further closure element covers the magnet arrangement, wherein the carrier unit has a holding element and a further sealing element, wherein the receptacle is arranged in the holding element, and wherein the further sealing element is arranged between the holding element and the carrier.

* * * * *